Sept. 22, 1970  S. R. CUDNOHUFSKY  3,529,705

HYDRAULIC CLUTCH ACTUATING MECHANISM

Filed March 21, 1969  2 Sheets-Sheet 1

INVENTOR.
SYLVESTER R. CUDNOHUFSKY
BY
Barnes, Kisselle, Rauch & Choate
ATTORNEYS

United States Patent Office 3,529,705
Patented Sept. 22, 1970

3,529,705
HYDRAULIC CLUTCH ACTUATING MECHANISM
Sylvester R. Cudnohufsky, 1290 Lake Angelus Shore Drive, Pontiac, Mich. 48055
Filed Mar. 21, 1969, Ser. No. 809,145
Int. Cl. F16d 25/10
U.S. Cl. 192—87.18          17 Claims

ABSTRACT OF THE DISCLOSURE

A lathe having a work-supporting spindle adapted to be operated at high speed by coupling the spindle to the motor driven shaft by a first hydraulic clutch and at low speed by coupling the spindle to the motor driven shaft by a second hydraulic clutch. The clutches are selectively connected to a low pressure supply source by a shiftable valve mechanism. An accumulator is charged by a high pressure source to a value substantially higher than the supply pressure. A valve is arranged to discharge the accumulator to the high speed clutch whenever the shiftable valve mechanism is actuated to operate the high speed clutch.

---

Figure 1:
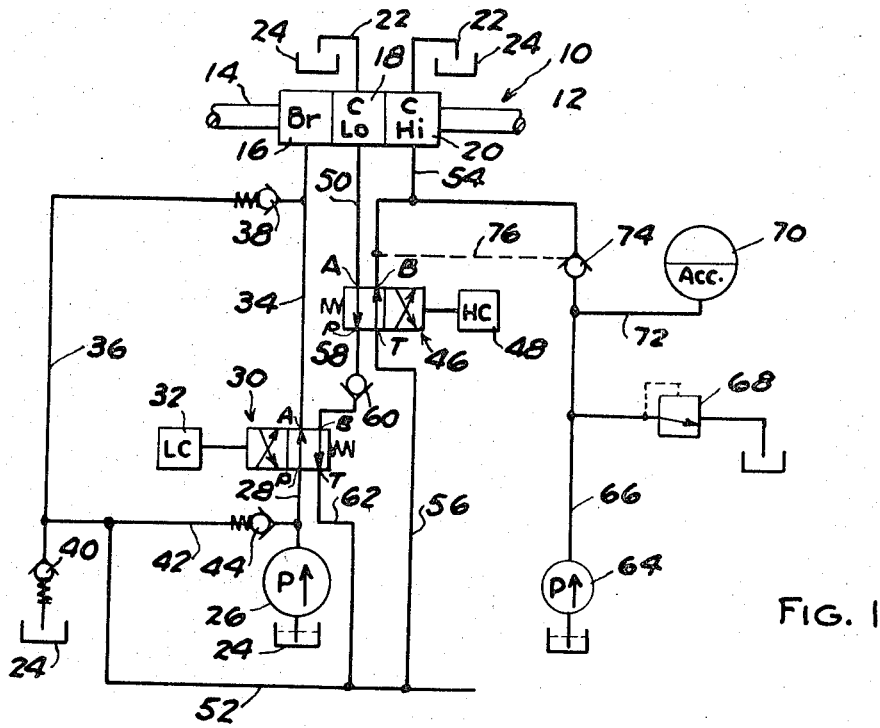

This invention relates to machine tools and more particularly to a lathe, the work-supporting spindle of which is adapted to be coupled to a drive motor through either a high speed clutch or a low speed clutch.

In some types of machine tools (such as a lathe) where in the course of a cutting cycle it is desired to increase the speed of the work-supporting spindle from a predetermined low value to a predetermined high value, such transition in speed is frequently effected by the use of hydraulic clutches. In such arrangements, unless the transition from low speed to high speed is made very rapidly, there is a tendency for the cutting tool to gouge or otherwise damage or mark the part being machined. This problem is overcome by shifting the high speed clutch to the fully engaged position in a minimum of time following the deenergizing of the low speed clutch.

The primary object of the present invention is to provide a hydraulic circuit for operating a hydraulic clutch at a very rapid rate.

A more specific object of the present invention is to provide a hydraulic circuit which includes a high pressure accumulator adapted to assist a low pressure supply source in operating a clutch at a very rapid rate.

A further object of the invention is to eliminate damage or marking of a workpiece being machined on a lathe when the speed of the work-supporting spindle is increased from a low to a high value during a machining operation.

Figure 2:
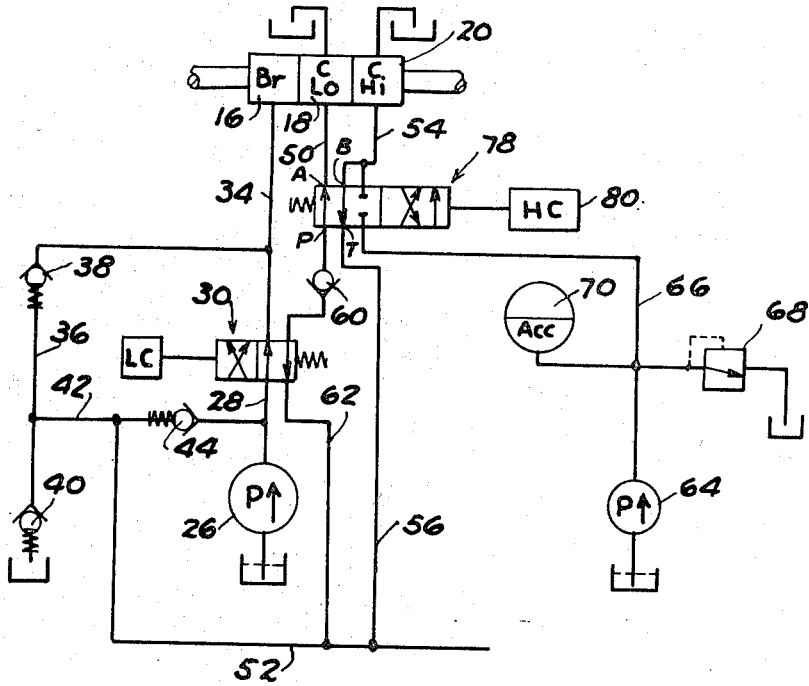
Figure 3:
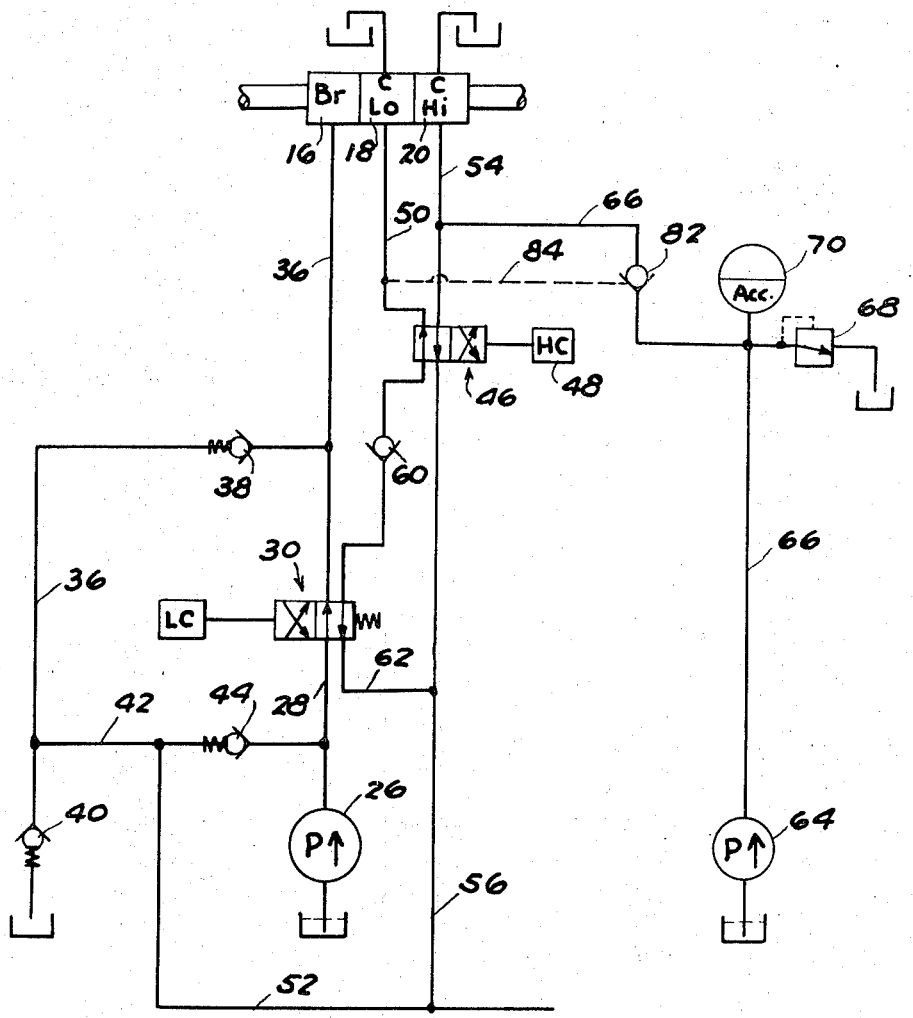

In the drawings:

FIGS. 1, 2 and 3 are diagrammatic showings of three different embodiments of the present invention.

In the embodiments illustrated in each of the figures the drive mechanism of a lathe is generally designated 10. This drive mechanism includes a motor driven shaft 12, a work-supporting spindle 14, a brake 16 operable on spindle 14 to arrest rotation thereof, a clutch 18 for coupling spindle 14 to shaft 12 for low speed operation and a clutch 20 for coupling spindle 14 to shaft 12 for high speed operation. The necessary gearing for rotating the spindle at low and high speeds is conventional and not illustrated. Furthermore, although two separate clutches 18 and 20 are illustrated, it will be appreciated that these two clutches may comprise separate sections of a single hydraulic clutch assembly. In the embodiments illustrated clutches 18 and 20 are of the type which, when operated, require the flow of pressurized fluid clear through the clutches. Accordingly, clutches 18, 20 each have a discharge line 22 extending to tank 24.

The source of hydraulic pressure for operating brake 16 and clutches 18 and 20 comprises a pump 26, the outlet side of which is connected by a conduit 28 with port P of a four-way solenoid valve 30. When solenoid 32 of valve 30 is deenergized, port A of valve 30 connects pressure line 28 with a conduit 34 extending to hydraulic brake 16.

Pump 26 will be referred to as a low pressure pump and, by way of example, is capable of delivering about 4 or 5 gallons per minute at a pressure of 140 p.s.i. Brake 16 is normally designed to be operated at a pressure substantially less than the pressure developed by pump 26. Accordingly, the brake supply line 34 is connected to sump 24 by a conduit 36 in which there are serially arranged two spring loaded check valves 38, 40. A conduit 42 extending from pressure line 28 to conduit 36 between valves 38 and 40 has a spring loaded check valve 44 therein. By way of example, valve 44 is designed to open when the pressure drop across the valve exceeds 125 p.s.i. Valve 38 is designed to open when the pressure drop across it exceeds about 45 p.s.i. and valve 40 is designed to open when the pressure drop across it exceeds 15 p.s.i. Thus under normal operating conditions valve 44 prevents the pressure at the outlet of pump 26 from exceeding 140 p.s.i.; valve 38 prevents the pressure in conduit 34 from exceeding 60 p.s.i.; and valve 40 prevents the pressure in conduits 36, 42, 52 and 56 from exceeding 15 p.s.i.

A second four-way solenoid valve 46 is arranged between valve 30 and clutches 18, 20. The solenoid for operating valve 46 is designated 48. When the solenoids 32 and 48 are in the deenergized condition the inlet line 50 of clutch 18 is connected to the common low (15 p.s.i.) pressure supply line 52 and the inlet line 54 of clutch 20 is likewise connected to line 52 via a conduit 56 extending to the tank port T of valve 46 from 15 p.s.i. supply line 52. A conduit 58 extends from the pressure port P of valve 46 to port B of valve 30. A check valve 60 in conduit 58 prevents flow in a direction from valve 46 to valve 30. A conduit 62 extends from the tank port T of valve 30 to the common low pressure line 52. Inlet line 50 of clutch 18 connects with port A of valve 46 and inlet line 54 of clutch 20 connects with port B of valve 46.

With the valve arrangement described above, when solenoid 32 is energized and solenoid 48 is deenergized, hydraulic fluid at the combined pressure of valves 44 and 40 (the supply pressure of pump 26) is directed from pump 26 through valves 30 and 46 to clutch 18. At this time the inlet of clutch 20 is connected to low pressure supply line 52 through valve 46 and conduit 56. When solenoids 32 and 48 are both energized, fluid at the supply pressure of pump 26 is directed through valve 30 and valve 46 to the inlet line 54 of clutch 20. Valve 40 provides the small back pressure in line 52 and tank line 56 for assuring separation of the clutch plates in clutch 18 and/or clutch 20 when they are deenergized.

A second pump 64 is also provided for causing clutch 20 to engage or operate very rapidly when solenoid 48 is energized. Pump 64 (hereinafter referred to as a high pressure pump) provides a source of high fluid pressure; for example, ½ gallon per minute at 1,000 p.s.i. Thus pump 64 is capable of delivering substantially higher pressures than are normally required for the operation of clutches 18 and 20. However, pump 64 is a relatively small pump having a relatively low volumetric capacity (a volume capacity less than required for operating clutches 18 and 20 which, for example, may be about 3 gallons per minute at 140 p.s.i.). A conduit 66 extends from the high pressure side of pump 64 to the inlet line 54 of high speed clutch 20. A relief valve 68 connects with high pressure line 66 to limit the maximum pressure therein. There is also connected to high pressure line 66 an accumulator 70 as by a conduit 72.

Within high pressure line 66 (between its junctions with conduits 72 and 54) there is arranged a check valve 74 which is normally closed and which is pilot-operated, as indicated by the pilot line 76, to open when solenoid 48 is energized to admit fluid at the supply pressure to inlet line 54 of high speed clutch 20.

The operation of the hydraulic circuit arrangement illustrated in FIG. 1 is believed to be clear from the above description. When solenoid 32 is de-energized oil at about 60 p.s.i. is directed to brake 16 and rotation of spindle 14 is arrested. When solenoid 32 is energized and solenoid 48 deenergized, brake 16 is released and fluid at the supply pressure from pump 26 is directed through inlet line 50 to thereby operate the low speed clutch 18. During the brake and low speed clutch portion of the cycle accumulator 70 is charged by pump 64 to a relatively high pressure determined by the setting of relief valve 68. When it is desired to shift the spindle to high speed operation, solenoid 48 is actuated so that fluid at the supply pressure from pump 26 will be directed through the inlet line 54 of high speed clutch 20. When this occurs check valve 74 opens in response to the supply pressure obtaining in line 54 and thus enables the charged accumulator 70 to discharge to the inlet line 54 of high speed clutch 20. Since the pressure in the charged accumulator is at a relatively high value the high speed clutch 20 shifts to the engaged position at a highly accelerated rate as compared to the normal shifting speed at the supply pressure of pump 26.

The arrangement shown in FIG. 2 is generally similar to that shown in FIG. 1. However, in the arrangement shown in FIG. 2 the operation of clutches 18, 20 is controlled by a six-ported valve 78 operated by a solenoid 80. When solenoid 80 is energized, ports C and D of valve 78 are interconnected so that accumulator 70 discharges to high speed clutch 20 through high pressure line 66. In other respects the circuit arrangement shown in FIG. 2 is the same as that shown in FIG. 1. This circuit has the advantage that the accumulator is switched in immediately, without having to wait for pressure to come up in line 54 to operate valve 74. However, it requires valve 78 of somewhat special construction.

A further modification of the circuit arrangement of the present invention is shown in FIG. 3. This arrangement is very similar to that illustrated in FIG. 1 except that in place of check valve 74 as shown in FIG. 1 there is arranged in high pressure line 66 a normally open valve 82 which is closed by pilot pressure as indicated at 84 from inlet line 50 to low speed clutch 18. With this arrangement accumulator 70 is charged during that portion of the cycle that the low speed clutch is engaged. When it is desired to shift the spindle from low to high speed, solenoid 48 is energized. As soon as solenoid 48 is energized to shift the spool of valve 46 the pressure in inlet line 50 drops very rapidly to the setting of valve 40; for example, to 15 p.s.i., since clutch 18 drains directly to tank 24 at one side and to valve 40 at its other side. For this reason valve 82 responds almost immediately to the energizing of valve 46 and clutch 20 is therefore operated at a very accelerated rate. The arrangement shown in FIG. 3 thus reduces to a minimum the delay involved in rendering high speed clutch 20 accessible to the high pressure of accumulator 70 while still permitting the use of a relatively simple valve such as shown at 82.

In each of the embodiments illustrated it is important that accumulator 70 be properly sized. Accumulator 70 should be sized so that when the volume of oil corresponding to that required to cause the clutch elements to be driven from full disengagement to full engagement has been delivered, the pressure in the accumulator has dropped to only slightly greater than the supply setting of pump 26 which, as pointed out previously, may be 140 p.s.i. If the pressure in the accumulator does not drop down to substantially the supply pressure, the accumulator is too large. It is likely that it will retain the high pressure charge for a long enough time to damage the clutch, since the plates of this type clutch are not supported well enough to withstand pressures in excess of their rating for any length of time. On the other hand, if the accumulator pressure drops too far when the high speed clutch is operated the maximum acceleration in the operation of the clutch will not be obtained.

I claim:

1. In combination a machine tool having a driven rotatable shaft, a hydraulic clutch for driving said shaft at high speed and a hydraulic clutch for driving said shaft at low speed, a source of hydraulic pressure for supplying pressure fluid to operate said clutches, valve means actuatable to selectively connect either of said clutches with said pressure source to operate the clutches, a second source of hydraulic pressure capable of delivering a substantially higher pressure than said first source, an accumulator connected with said second source and adapted to be charged thereby to a predetermined pressure substantially higher than required to operate said high speed clutch and means responsive to actuation of said valve means to operate said high speed clutch for connecting said accumulator to said high speed clutch and thereby operate the high speed clutch at a rate substantially higher than the rate at which the high speech clutch would be operated by said first pressure source alone.

2. The combination called for in claim 1 wherein said accumulator is sized such that when it is charged to said predetermined pressure and said high speed clutch is operated, the pressure in the accumulator drops to approximately the supply pressure of said first source.

3. The combination called for in claim 1 wherein the volumetric capacity of said second source at said high pressure is less than the volumetric capacity of said first source at said supply pressure.

4. The combination called for in claim 1 wherein the volumetric capacity of said second source at said high pressure is less than the volumetric capacity of said first source at said supply pressure and less than the fluid volume requirements to operate said high speed clutch at said supply pressure.

5. The combination called for in claim 1 wherein said last-mentioned means includes a conduit extending from said accumulator to said high speed clutch and a valve in said conduit adapted to open in response to actuation of said valve means to operate the high speed clutch.

6. The combination called for in claim 5 including a conduit extending from said valve means to the high speed clutch and through which pressure fluid is directed from said lower pressure supply source when the valve means are actuated to operate the high speed clutch, said valve comprising a normally closed check valve which is pilot operated to open in response to said supply pressure obtaining in the last-mentioned conduit.

7. The combination called for in claim 5 including a conduit extending from the valve means to the high speed clutch and a second conduit extending from the valve means to the low speed clutch, said valve means being adapted to selectively direct pressurized fluid through said conduits for operating said clutches, said valve being normally open and adapted to close in response to said supply pressure obtaining in the conduit extending from the valve means to the low pressure clutch.

8. The combination called for in claim 5 wherein said valve is normally closed and including means for opening said valve in unison with said valve means when the latter is actuated to operate the high speed clutch.

9. In combination a lathe having a work supporting spindle, a drive mechanism for said spindle which includes a first hydraulic clutch which when operated drives the spindle at a predetermined low speed and a second hydraulic clutch which when operated drives the spindle at a predetermined high speed, a source of relatively low hydraulic pressure for supplying pressure fluid to operate either of said clutches, valve means in circuit between said clutches and said pressure source which are actuatable to selectively connect said pressure source with either of said clutches to operate said clutches, a second source of hydraulic pressure capable of delivering fluid at a pressure substantially higher than said first source, an accumulator normally charged by said second source to a predetermined pressure substantially higher than said supply pressure and means for discharging said accumulator to said high speed clutch when the valve means are actuated to operate the high speed clutch whereby the high speed clutch is operated at a rate substantially greater than it would be operated by said low pressure source alone.

10. The combination called for in claim 9 wherein said second source has a volumetric capacity at said higher pressure less than required to operate said clutches.

11. The combination called for in claim 10 wherein each of said clutches has an inlet port connected to said valve means and an outlet port adapted to discharge to a relatively low pressure.

12. The combination called for in claim 11 wherein said valve means are adapted to connect the inlet port of the low speed clutch to a relatively low pressure when the high speed clutch is operated and to connect the inlet port of the high speed clutch to a relatively low pressure when the low speed clutch is operated.

13. The combination called for in claim 11 including conduit means extending from said valve means to the inlet port of the high speed clutch and conduit means extending from said valve means to the inlet port of the low speed clutch and wherein said means for discharging said accumulator to the high speed clutch include conduit means extending from the accumulator to the inlet port of the high speed clutch and a normally open valve in the last-mentioned conduit means which is adapted to close in response to the supply pressure obtaining in the conduit means extending between the valve means and the inlet port of the low speed clutch.

14. The combination called for in claim 11 including conduit means extending from said valve means to the inlet port of the high speed clutch and conduit means extending from said valve means to the inlet port of the low speed clutch and wherein said means for discharging said accumulator to the high speed clutch include conduit means extending from the accumulator to the inlet port of the high speed clutch and a normally closed valve in the last-mentioned conduit means adapted to open in response to said supply pressure obtaining in the conduit means between said valve means and the inlet port of the high speed clutch.

15. The combination called for in claim 11 including conduit means extending from said valve means to the inlet port of the high speed clutch and conduit means extending from said valve means to the inlet port of the low speed clutch and wherein said means for discharging said accumulator to the high speed clutch include conduit means extending from the accumulator to the inlet port of the high speed clutch and a valve in said last-mentioned conduit means adapted to open when the valve means are actuated to operate the high speed clutch.

16. The combination called for in claim 10 wherein said accumulator is sized in relation to the fluid volume required to operate the high speed clutch at said supply pressure such that when the accumulator is charged to said predetermined high pressure and discharges to the high speed clutch the pressure therein drops from said predetermined high pressure to approximately said supply pressure.

17. The combination called for in claim 9 wherein said means for discharging said accumulator to said clutch comprise a port on said valve means connected with said high speed clutch, a second port on said valve means connected with said accumulator and means for placing said ports in communication when the valve means are actuated to operate the high speed clutch.

References Cited

UNITED STATES PATENTS 3,106,273 10/1963 Doerfer et al.
3,149,498 9/1964 Mack.

ALLAN D. HERRMANN, Primary Examiner

U.S. Cl. X.R.

192—4, 12